A. S. STANDISH.
CHAIN LINK WELDING PRESS.
APPLICATION FILED DEC. 7, 1910.
996,947.
Patented July 4, 1911.
2 SHEETS—SHEET 1.
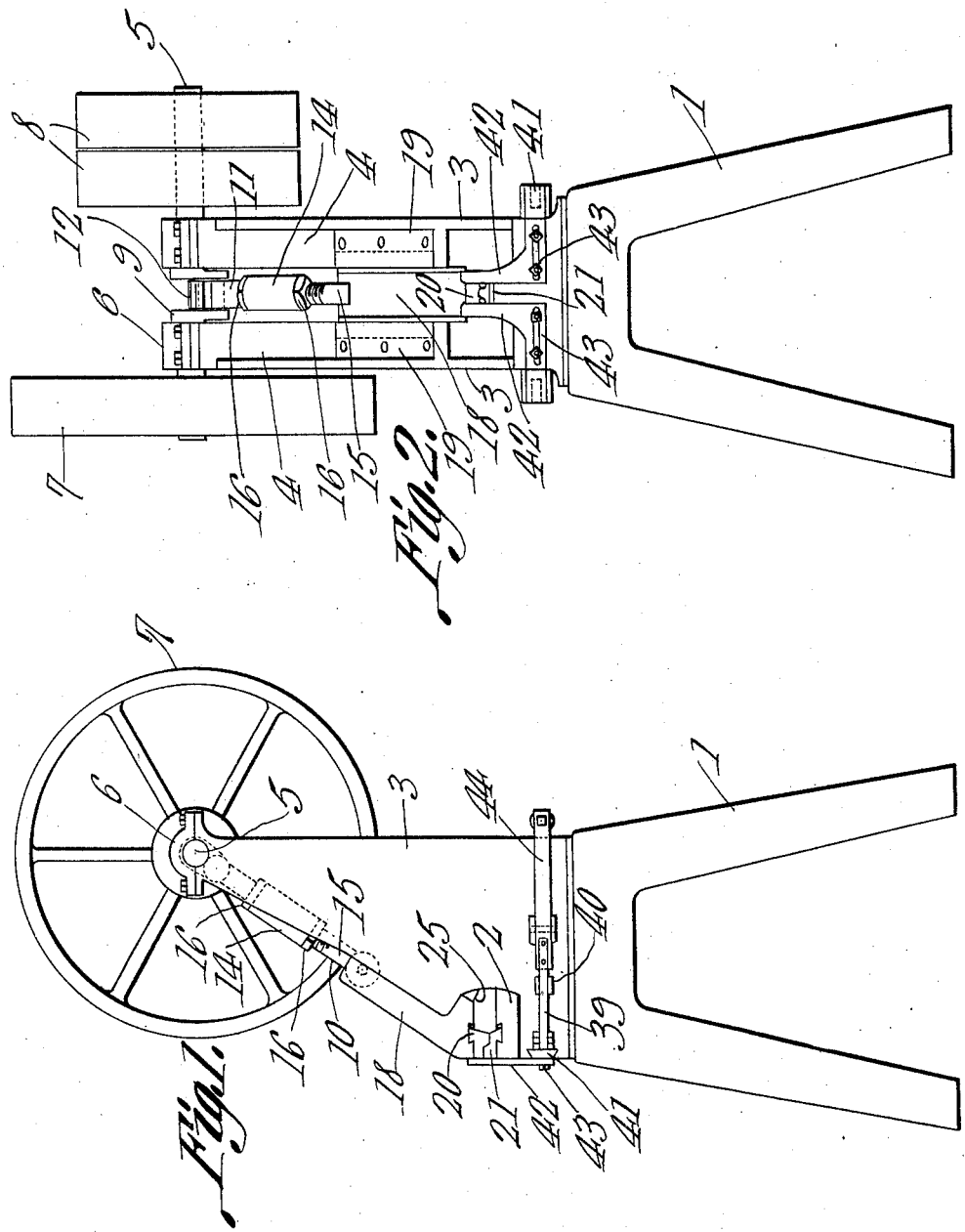

A. S. STANDISH.
CHAIN LINK WELDING PRESS.
APPLICATION FILED DEC. 7, 1910.
996,947.
Patented July 4, 1911.
2 SHEETS—SHEET 2.
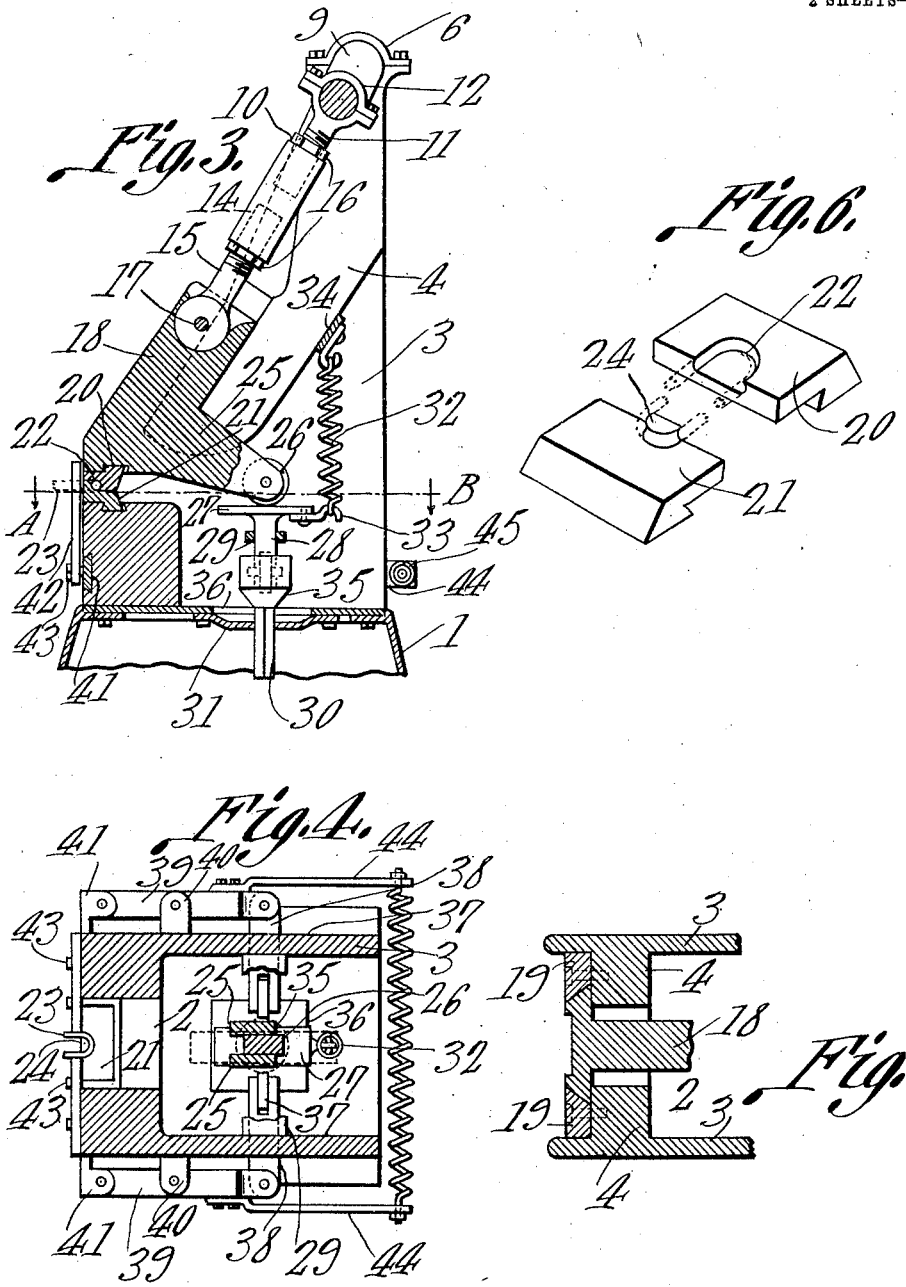
Witnesses
J. R. Tomlin
Mason B. Lawton
A. S. Standish
Inventor
by C. A. Snow & Co.
Attorneys
COLUMBIA PLANOGRAPH CO., WASHINGTON, D. C.

UNITED STATES PATENT OFFICE.

ALBERT SENTER STANDISH, OF CLEVELAND, OHIO.

CHAIN-LINK-WELDING PRESS.

996,947. Specification of Letters Patent. Patented July 4, 1911.

Application filed December 7, 1910. Serial No. 596,065.

*To all whom it may concern:*

Be it known that I, ALBERT SENTER STANDISH, a citizen of the United States, residing at Cleveland, in the county of Cuyahoga and State of Ohio, have invented a new and useful Chain-Link-Welding Press, of which the following is a specification.

It is the object of this invention to provide, in a chain making machine, novel means for moving together the open ends of a link, and to provide novel means for welding the ends of the link after the same have been brought together.

Another object of the invention is to provide novel means for operating the jaws whereby each link of the chain is brought together for welding in the dies.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings, Figure 1 is a side elevation, parts being removed; Fig. 2 is a front elevation; Fig. 3 is a vertical longitudinal section, parts being shown in elevation; Fig. 4 is a horizontal section on the line A—B of Fig. 3; Fig. 5 is a transverse section of the cross head and that portion of the frame in which the head is immediately mounted, parts being broken away; and Fig. 6 is a perspective of the dies.

The device forming the subject matter of this application, is shown as mounted upon a suitable support 1. The device proper embraces a frame, denoted generally by the numeral 2, the frame 2 including upright standards 3, provided upon their forward faces with guide ways 4. A drive shaft 5 is supported for rotation upon the upper ends of the standards 3, the drive shaft 5 being retained in place by bearings 6. To one end of the drive shaft 5, a fly wheel 7 may be secured, pulleys 8 being mounted upon the other extremity of the drive shaft. One of these pulleys 8 is secured to the drive shaft, to constitute a means for operating the shaft, while the other of the pulleys 8 is loose upon the drive shaft.

The drive shaft 5 is provided in its intermediate portion, with a crank 9, disposed between the guide ways 4. With this crank 9, a pitman, denoted generally by the numeral 10 in Fig. 1, is connected. The pitman 10 includes an upper member 11, secured to the crank 9 by means of a cap bearing 12. Upon the lower end of the member 11 of the pitman, a turn buckle 14 is threaded, the lower member 15 of the pitman 10 being threaded into the opposite extremity of the turn buckle. Lock nuts 16 may be mounted upon the pitman members 11 and 15 to maintain the pitman 10 as a rigid structure, the lock nuts 16 and the turn buckle 14 obviously constituting a means whereby the pitman 10 may be lengthened or shortened.

As seen to best advantage in Fig. 3, and there denoted by the numeral 17, the lower member 15 of the pitman is pivoted to a cross head 18, mounted for reciprocation upon the guide ways 4. The cross head 18 is held in place upon the guide ways 4, for sliding movement, by means of guide plates 19, secured to the guide ways 4, and overhanging the edges of the cross head 18.

To the lower face of the cross head 18, a movable die 20 is keyed or otherwise secured, this die 20 coöperating with a fixed die 21, keyed or otherwise secured to a convenient and accessible portion of the frame 2. The movable die 20 is grooved, as shown at 22, to receive a link 23 of the chain which is to be formed, there being in the fixed die 21, an upstanding lug 24, adapted to register within the link 23.

An arm 25 outstands rearwardly from the cross head 18, and in the arm 25 there is mounted for rotation, an anti-friction device, preferably a roller 26. When the cross head 18 moves downwardly, this roller 26 is adapted to bear upon a table 27, formed at the upper end of a plunger 28, mounted for vertical sliding movement in a bearing 29 united with standards 3. The lower extremity of the plunger 28 is squared, as shown at 30, to register slidably, but against rotation, in a bracket 31, secured to the frame 2, or rigidly held in proper position in any other manner. The plunger 28 is maintained normally uplifted by means of a retractile spring 32, the lower end of which is engaged over a hook 33 or the like, carried by the table 27, the upper extremity of the spring 32 being united with a support 34 carried by the guides 4.

Intermediate its ends, the plunger 28 is equipped with a head 35. This head 35 is frusto-conical in general outline, and may be described roughly, as being wedge-shaped since, in operation, it exercises the function of a wedge, in separating certain elements of the structure which will be described in detail hereinafter. The lower portion of the frame is cut away, as shown at 36, in order to permit the vertical reciprocation of the head 35 of the plunger.

The frusto-conical, wedge head 35 of the plunger, as it moves downwardly, is adapted to engage rollers 37, or other anti-friction devices, positioned upon the adjacent ends of arms 38, slidably mounted in the frame 2, and extended from opposite faces of the frame toward the center thereof. At their outer extremities, these arms 38 are pivoted to levers 39, fulcrumed at 40 upon opposite sides of the frame 2, the forward ends of the levers 39 being pivotally connected with slides 41, dove-tailed into the frame 2 for reciprocating movement. As seen to best advantage in Fig. 2, angular jaws 42 are adjustably connected with the slides 41 by means of a bolt and slot connection 43. These jaws reciprocate, across the outer faces of the dies 20 and 21, at an angle to the line of movement of the cross head 18. The levers 39 are equipped with rearwardly projecting extensions 44, the extremities of these extensions being united by a retractile spring 45.

The operation of the device is as follows. It will of course be understood, without detailed explanation, that when the drive shaft 5 is rotated by means of one of the pulleys 8, the cross head 18 will be reciprocated, advancing the movable die 20 against the fixed die 21, and retracting the movable die from the fixed die. When the cross head 18 is elevated, spacing the dies 20 and 21 apart, the head 35 of the plunger 28 will be withdrawn from between the rollers 37 which are mounted upon the adjacent ends of the arms 38. When the head 35 is thus uplifted by the action of the spring 32, the spring 45 will operate to tilt the levers 39, moving the slides 41 in opposite direction, and separating the jaws 42. A link is then heated and hooked into the chain, the link being then positioned upon the fixed die 21. As the cross head 18 descends, the roller 26 will bear against the table 27, depressing the plunger 28 and introducing the head 35 of the plunger between the adjacent ends of the arms 38, tilting the levers 39, and putting the spring 45 under tension. This tilting of the levers 39, will advance the jaws 42, toward each other, the jaws engaging opposite sides of the link, and pressing the open ends of the link together. As the movable die 20 descends, with the cross head 18, the die 20 coöperating with the die 21, will weld the ends of the link, which have previously been brought together by the movement of the jaws 42. The link may then be inverted, to receive another, finishing stroke from the movable die 20. The bolt and slot connection between the jaws 42 and the slides 41, enables the operator to space the jaws apart, so as to accommodate links of different widths. By reason of the fact that the squared end 30 of the plunger 28 registers against rotation in the bracket 31, the table 27 will be properly positioned with respect to the roller 26, and the spring 32 will be permitted to exercise a straight upward pull upon the plunger 28.

Having described the invention, what is claimed is:

1. In a device of the class described, a frame; a fixed die thereon; a movable die coöperating with the fixed die; frame-carried jaws arranged to reciprocate at an angle to the meeting faces of the dies, the jaws being located beyond the contour of the dies; means for operating the movable die; and means for operating the jaws.

2. In a device of the class described, a reciprocatory die carrying cross head; a plunger mounted for longitudinal sliding movement and adapted to be depressed by the cross head; yieldable means for lifting the plunger; jaw carrying members mounted for sliding movement at an angle to the line of movement of the cross head; elements operatively connected with the jaw carrying members and disposed upon both sides of the plunger for separation by the plunger as it descends; and yieldable means for retracting said elements into the path of the plunger.

3. In a device of the class described, a frame; a fixed die thereon and a movable die coöperating with the fixed die; jaws reciprocating across the outer faces of the dies; levers fulcrumed intermediate their ends upon the frame and operatively connected at one end with the jaws; a retractile spring uniting the other ends of the levers; arms pivoted to the levers and extended toward the center of the frame; and a slidably mounted plunger operating between the adjacent ends of the arms to separate the same.

4. In a device of the class described, a frame; a fixed die thereon and a movable die coöperating with the fixed die; jaws mounted for reciprocation in the frame across the outer edges of the dies; oppositely disposed mechanisms for operating the jaws; a plunger mounted for reciprocation in the frame and provided with a head having inclined faces engaging said mechanisms to operate the same; inter-engaging elements upon the frame and the plunger to hold the plunger against rotation; means for maintaining said mechanisms normally in the path of the head; and means for operating the plunger.

5. In a device of the class described, a frame; a fixed die thereon; a cross head arranged to reciprocate in the frame; a die secured to the cross head and coöperating with the fixed die; jaws slidably connected with the frame and arranged to reciprocate across the outer edges of the dies; levers fulcrumed upon the frame and operatively connected with the jaws; arms pivoted to the levers and extended toward the center of the frame; a plunger slidably mounted in the frame and having a wedge head operating between the arms to tilt the levers, the plunger being provided with a table at its upper end; anti-friction means upon the cross head, adapted to bear upon the table to depress the plunger; spring means for elevating the plunger; and spring means for maintaining the arms normally in the path of the head of the plunger.

In testimony that I claim the foregoing as my own, I have hereto affixed my signature in the presence of two witnesses.

ALBERT SENTER STANDISH.

Witnesses:
GEO. F. SCHULZE,
CHARLES J. LANGDON.

---

Copies of this patent may be obtained for five cents each, by addressing the "Commissioner of Patents, Washington, D. C."